(12) United States Patent
Daido et al.

(10) Patent No.: US 12,340,303 B2
(45) Date of Patent: Jun. 24, 2025

(54) COMPUTER-IMPLEMENTED METHOD AND DEVICE FOR GENERATING FREQUENCY COMPONENT VECTOR OF TIME-SERIES DATA

(71) Applicant: YAMAHA CORPORATION, Hamamatsu (JP)

(72) Inventors: Ryunosuke Daido, Hamamatsu (JP); Kanru Hua, Chiyoda-ku (JP)

(73) Assignee: YAMAHA CORPORATION, Hamamatsu (JP)

( * ) Notice: Subject to any disclaimer, the term of this patent is extended or adjusted under 35 U.S.C. 154(b) by 1116 days.

(21) Appl. No.: 17/171,453

(22) Filed: Feb. 9, 2021

(65) Prior Publication Data

US 2021/0166128 A1 Jun. 3, 2021

Related U.S. Application Data

(63) Continuation of application No. PCT/JP2019/031380, filed on Aug. 8, 2019.

(30) Foreign Application Priority Data

Aug. 10, 2018 (JP) .................................. 2018-151748
Sep. 11, 2018 (JP) .................................. 2018-169304

(51) Int. Cl.
G06N 3/08 (2023.01)
G06N 3/045 (2023.01)

(52) U.S. Cl.
CPC ............... *G06N 3/08* (2013.01); *G06N 3/045* (2023.01)

(58) Field of Classification Search
CPC .................................. G06N 3/08; G06N 3/04
See application file for complete search history.

(56) References Cited

U.S. PATENT DOCUMENTS 5,828,993 A * 10/1998 Kawauchi ........... G10L 19/0208
704/201
10,522,167 B1 * 12/2019 Ayrapetian .............. G10L 17/18
(Continued)

FOREIGN PATENT DOCUMENTS

JP H0993135 A 4/1997
WO 2017141317 A1 8/2017

OTHER PUBLICATIONS

Eunwoo Song et al; Effective Spectral and Excitation Modeling Techniques for LSTM-RNN-Based Speech Synthesis Systems, Nov. 1, 2017, IEEE, vol. 25, No. 11, pp. 2152-2161 (Year: 2017).*

(Continued)

*Primary Examiner* — Phenuel S Salomon
(74) *Attorney, Agent, or Firm* — ROSSI, KIMMS & McDOWELL LLP

(57) ABSTRACT

A computer-implemented method generates a frequency component vector of time series data, by executing a first process and a second process in each unit step. The first process includes: receiving first data; and processing the first data using a first neural network to generate intermediate data. The second process includes: receiving the generated intermediate data; and generating a plurality of component values corresponding to a plurality of frequency bands based on the generated intermediate data such that: a first component value corresponding to a first frequency band is generated using a second neural network based on the generated intermediate data; and a second component value corresponding to a second frequency band different from the first frequency band is generated using the second neural network based on the generated intermediate data and the generated first component value corresponding to the first frequency band.

12 Claims, 4 Drawing Sheets

(56) References Cited

U.S. PATENT DOCUMENTS

| | | | |
|---|---|---|---|
| 11,062,725 B2* | 7/2021 | Variani | G10L 19/008 |
| 2016/0350649 A1* | 12/2016 | Zhang | G06N 3/084 |
| 2017/0236531 A1* | 8/2017 | Koretzky | G06F 3/04847 |
| | | | 381/17 |
| 2017/0278513 A1* | 9/2017 | Li | G10L 15/20 |
| 2017/0325023 A1* | 11/2017 | Nongpiur | H04R 1/406 |
| 2017/0330586 A1* | 11/2017 | Roblek | G10L 25/30 |
| 2018/0374497 A1* | 12/2018 | Furuta | G10L 25/30 |

OTHER PUBLICATIONS

Okamoto Takuma et al, Subband wavenet with overlapped single-sideband filterbanks, Dec. 16, 2017, IEEE, pp. 698-704, (Year: 2017).*

Extended European search report issued in European Appln. No. 19847694.7 mailed on Jun. 7, 2022.

Song "Effective Spectral and Excitation Modeling Techniques for LSTM-RNN-Based Speech Synthesis Systems" EEE/ACM Transactions On Audio, Speech, and Language Processing. Nov. 2017: pp. 2152-2161. Vol. 25, No. 11. Cited in NPL 1.

Okamoto "Subband Wavenet With Overlapped Single-Sideband Filterbanks" IEEE Automatic Speech Recognition and Understanding Workshop (ASRU). Dec. 2017: pp. 698-704. Cited in NPL 1.

Office Action issued in Japanese Appln. No. 2020-125440 mailed on Feb. 22, 2022. English machine translation provided.

International Search Report issued in Intl. Appln. No. PCT/JP2019/031380 mailed Oct. 21, 2019. English translation provided.

Written Opinion issued in Intl. Appln. No. PCT/JP2019/031380 mailed Oct. 21, 2019.

Van Den Oord. "WaveNet: A Generative Model for Raw Audio." arXiv:1609.03499v1 [cs.SD] Sep. 12, 2016. Cited in Specification.

Blaauw. "A Neural Parametric Singing Synthesizer." arXiv:1704.03809v3 [cs.SD] Aug. 17, 2017. Cited in Specification.

Office Action issued in Chinese Appln. No. 201980052374.9, mailed on Apr. 17, 2024. English machine translation provided.

Office Action issued in European Appln. No. 19847694.7, mailed on Apr. 10, 2025.

* cited by examiner

COMPUTER-IMPLEMENTED METHOD AND DEVICE FOR GENERATING FREQUENCY COMPONENT VECTOR OF TIME-SERIES DATA

CROSS REFERENCE TO RELATED APPLICATIONS

This application is a continuation of PCT application No. PCT/JP19/031380, which was filed on Aug. 8, 2019 based on Japanese patent application No. 2018-151748 filed on Aug. 10, 2018 and Japanese patent application No. 2018-169304 filed on Sep. 11, 2018, the contents of which are incorporated herein by reference.

BACKGROUND

1. Technical Field

The present disclosure relates to data processing using a neural network.

2. Background Information

Time series data can be generated or transformed using a neural network. For example, Non-Patent Literature 1 discloses a WaveNet. In the WaveNet, at least one of an input value or an output value of a past sound sample sequence and auxiliary data relating to a property of an intended sound sample sequence to be outputted is used as an input to obtain a probability distribution for a value of a new sound sample per unit time, so that the value of the new audio sample can be obtained by sampling one value from the probability distribution. The aforementioned process is repeated every unit time so that an output sound sample sequence can be obtained. In the WaveNet, large-scale neural network calculation has to be performed for each audio sample. Usually several hundreds of thousands of audio samples are required as the audio samples. Therefore, there is a problem that the calculation amount is huge.

CITATION LIST

Non-Patent Literature

Non-Patent Literature 1: Van Den Oord, Aaron, et al. "Wavenet: A generative model for raw audio." CoRR abs/1609.03499 (2016)
Non-Patent Literature 2: Blaauw, Merlijn, and Jordi Bonada. "A neural parametric singing synthesizer." arXiv preprint arXiv: 1704.03809 (2017)

The WaveNet is a technique specialized for transforming or generating a sound sample sequence. An NPSS (Neural Parametric Singing Synthesizer) disclosed in Non-Patent Literature 2 is a form of the WaveNet which is directly applied for generating some kind of vector sequence data to thereby serve as a sound synthesizer. In the NPSS, probability distributions of respective dimensions of a vector consisting of several tens of dimensions of mel-cepstral coefficients expressing properties of a sound are outputted for all the dimensions simultaneously by a neural network having a similar form to the WaveNet. The probability distributions outputted here are not simultaneous probability distributions of all the dimensions or conditional probability distributions based on dependencies among the dimensions but probability distributions based on independency of each dimension. Therefore, this method can be limitedly applied to a case where an output with a sufficient quality can be obtained without dealing with the dependencies among the dimensions so strictly, such as mel-cepstral coefficients in a sound. In order to avoid such a limitation, it may be considered to output simultaneous probability distributions of all the dimensions or conditional probability distributions based on the dependencies among the dimensions by a neural network having a similar form. In this case, the number of probability distributions to be outputted by the neural network or the number of parameters thereof is so huge that calculation resources required for training or generation is huge. In addition, due to shortage of training data for the number of dimensions to be outputted, there is possibility that training cannot be performed suitably.

SUMMARY

In order to solve the foregoing problem, a method according to an embodiment of the present disclosure is a computer-implemented method for generating a frequency component vector of time series data in each unit step of a plurality of unit steps, by executing a first process and a second process in each unit step, in which: the first process comprises the steps of: receiving first data; and processing the first data using a first neural network to generate intermediate data as an alternative representation of the first data; and the second process comprises the steps of: receiving the generated intermediate data; and generating, as the frequency component vector, a plurality of component values corresponding to a plurality of frequency bands based on the generated intermediate data such that: a first component value corresponding to a first frequency band is generated using a second neural network based on the generated intermediate data; and a second component value corresponding to a second frequency band different from the first frequency band is generated using the second neural network based on the generated intermediate data and the generated first component value corresponding to the first frequency band.

In addition, a device according to an embodiment of the present disclosure is a device for generating a frequency component vector of time series data, including: a first processing portion that receives first data and processes the first data using a first neural network to generate intermediate data as an alternative representation of the first data; and a second processing portion that receives the generated intermediate data and generates, as the frequency component vector, a plurality of component values corresponding to a plurality of frequency bands based on the generated intermediate data such that: a first component value corresponding to a first frequency band is generated using a second neural network based on the generated intermediate data; and a second component value corresponding to a second frequency band different from the first frequency band is generated using the second neural network based on the generated intermediate data and the generated first component value corresponding to the first frequency band.

DETAILED DESCRIPTION OF THE EXEMPLARY EMBODIMENTS

1. Summary of the Disclosure

1.1 Embodiment of the Disclosure

A neural network according to an embodiment of the present disclosure includes:
- a main neural network that receives at least one vector as an input thereto and outputs at least one vector in each of unit times; and
- one or more sub-neural networks that, in each of the unit times, receive the output from the main neural network as a part or all of an input thereto and output at least one element value of a frequency component vector of general time series data at the unit time, a probability distribution of the element value, or a group of parameters expressing the probability distribution; wherein:
- at least one of the sub-neural networks outputs a value of the time depending on a value obtained by calculation of at least one of the sub-neural networks at the time.

1.2 Particularly Effective Embodiments (1) An embodiment in which a vector consisting of coefficients of DCT (Discrete Cosine Transform) is used as the frequency component vector.

(2) An embodiment in which a vector consisting of DST (Discrete Sine Transform) is used as the frequency component vector.

(3) An embodiment in which a vector consisting of MDCT (Modified Discrete Cosine Transform) is used as the frequency component vector.

(4) An embodiment in which a vector corresponding to an output at a time from a rate conversion filter bank is used as the frequency component vector.

(5) An embodiment in which a coefficient corresponding to a high frequency band is outputted depending on a value obtained by calculation of a coefficient corresponding to a low frequency band.

(6) An embodiment in which the main neural network is a large-scale network, and each of the sub-neural networks is a small-scale network or a function having no learnable coefficient.

(7) An embodiment in which each of the sub-neural networks has a different size based on accuracy required for a frequency component corresponding thereto.

(8) Particularly an embodiment in which the size of each of the sub-neural network is reduced as the sub-neural network corresponds to a higher frequency component.

(9) An embodiment in which a probability distribution of each coefficient is outputted.

(10) Particularly an embodiment in which a method for expressing the probability distribution differs based on a statistic property of each frequency component.

(11) Particularly an embodiment in which a method for obtaining a coefficient value from the probability distribution differs based on a property of each frequency component.

2. An Embodiment of the Disclosure

2.1 Hardware Configuration

Figure 1:
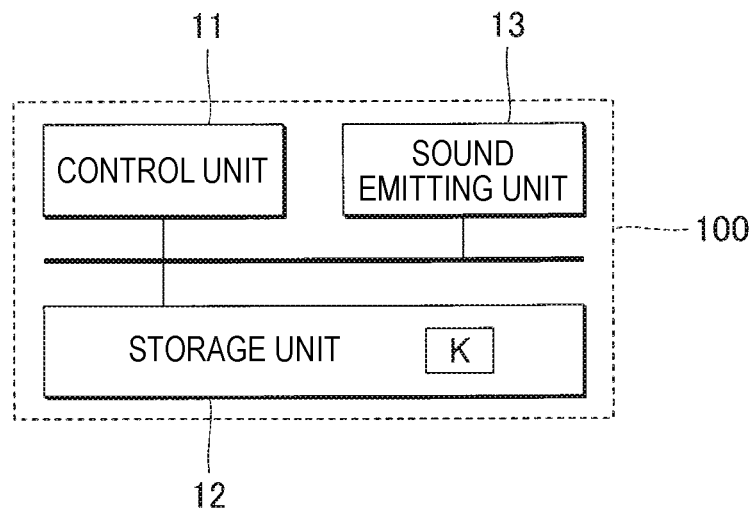
FIG. 1 is a block diagram showing a configuration of an information processing device according to an embodiment of the present disclosure by way of example.

FIG. 1 is a block diagram showing a configuration of an information processing device 100 according to an embodiment of the present disclosure by way of example. As shown in FIG. 1, the information processing device 100 according to the embodiment is a computer system provided with a control unit 11, a storage unit 12 and a sound emitting unit 13. An information terminal such as a cellular phone, a smartphone or a personal computer is used as the information processing device 100.

The control unit 11 is a processing circuit such as a CPU (Central Processing Unit), which integrally controls respective elements of the information processing device 100. The storage unit 12 is a memory constituted by a known recording medium such as a magnetic recording medium or a semiconductor recording medium, which stores programs to be executed by the control unit 11, and various kinds of data to be used by the control unit 11. For example, a plurality of coefficients K defining a neural network which will be described later are stored in the storage unit 12. Incidentally, the storage unit 12 may be constituted by a combination of a plurality of kinds of recording media. In addition, a portable recording medium to be removably attached to the information processing device 100, or an external recording medium (such as an online storage) with which the information processing device 100 can communicate through a communication network may be used as the storage unit 12. The control unit 11 reproduces a sound wave corresponding to a sound signal A through the sound emitting unit 13. A speaker or a headphone is a typical example of the sound emitting unit 13.

Figure 2:
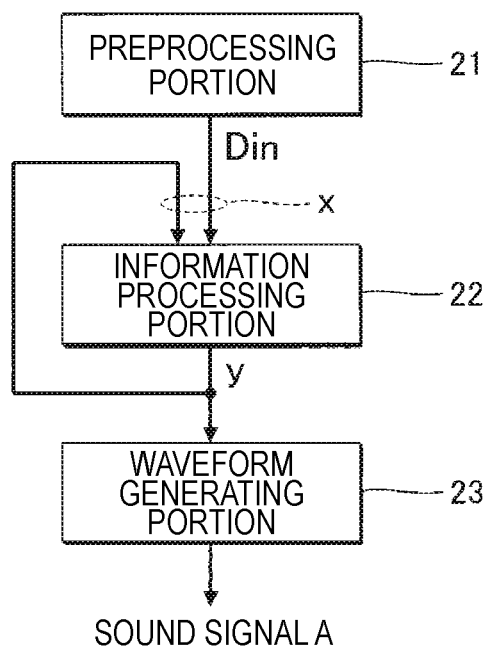
FIG. 2 is a block diagram showing a functional configuration of the information processing device by way of example.

FIG. 2 is a block diagram showing functions implemented by the control unit 11 executing a program stored in the storage unit 12 by way of example. As shown in FIG. 2, the control unit 11 according to the embodiment implements a preprocessing portion 21, an information processing portion 22 and a waveform generating portion 23. Incidentally, the functions of the control unit 11 may be implemented by a plurality of units arranged separately from one another. A part or all of the functions of the control unit 11 may be implemented by a dedicated electronic circuit.

For each of a plurality of unit steps on a time base, the preprocessing portion 21 generates a time series of input data Din expressing a property of a sound. The input data Din is a feature vector such as an amplitude spectrum. However, a combination of a lower-order mel-cepstral coefficient and a fundamental frequency, or a feature vector such as a mel-spectrogram may be generated as the input data Din. The preprocessing portion 21 uses a known transformation technique including sound synthesis to generate the input data Din, for example, from text information expressing speech contents. The unit steps are temporal units for processing by the information processing device 100.

The information processing portion 22 generates second data y based on first data x including the input data Din for each of the plurality of unit steps on the time base. The second data y is an N-order frequency component vector including N component values $y_1$ to $y_N$ corresponding to N frequency bands respectively (N is a natural number not smaller than 2). The N component values $y_1$ to $y_N$ are, for example, coefficients of MDCT (Modified Discrete Cosine Transform) using a cosine function as its base. Accordingly, each component value $y_n$ (n=1 to N) is a real number. A component value $y_n$ having a smaller number n corresponds to a lower frequency band. That is, the component value $y_1$ corresponds to the lowest frequency component of the N frequency components, and the component value $y_N$ corresponds to the highest frequency component of the N frequency components.

As shown in FIG. 2, the first data x in any one of the unit steps is a vector including the input data Din for the unit step and the second data y generated for the previous unit step. That is, the second data y generated by the information processing portion 22 is fed back to the input side of the information processing portion 22 as a part of the first data x.

The waveform generating portion 23 generates a sound signal A for a time region based on the time series of the second data y generated by the information processing portion 22. For example, the waveform generating portion 23 generates the sound signal A by IMDCT (Inverse MDCT) on the time series of the second data y. The sound signal A generated by the waveform generating portion 23 is supplied to the sound emitting unit 13 to be reproduced as a sound wave.

2.2 Network Configuration

Figure 3:
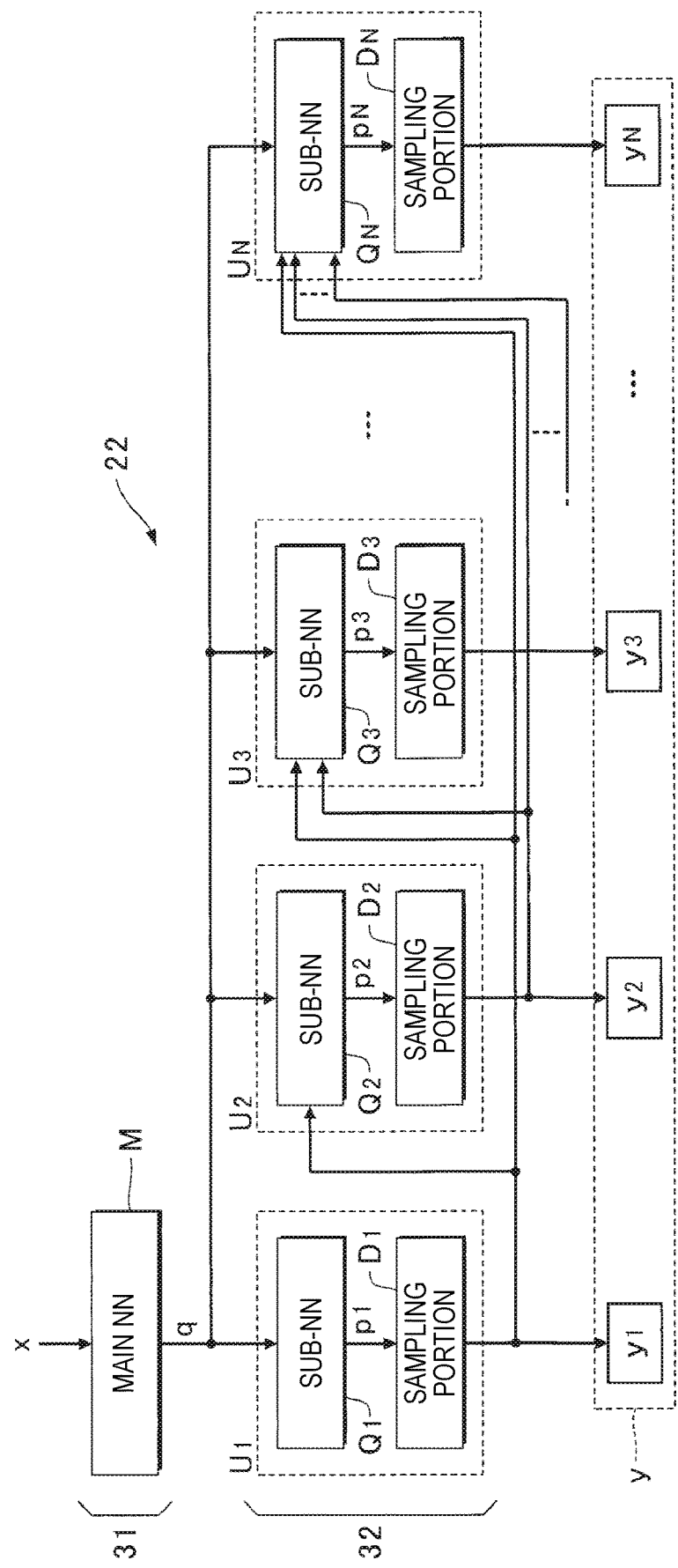
FIG. 3 is a block diagram showing a specific configuration of an information processing portion by way of example.

FIG. 3 is a block diagram showing a specific configuration of the information processing portion 22 implemented by the control unit 11 executing a program stored in the storage unit 12. As shown in FIG. 3, the information processing portion 22 in the embodiment is configured to include a first processing portion 31 and a second processing portion 32. The first processing portion 31 executes a first process in each of the plurality of unit steps on the time base. The first process is a process of generating intermediate data q representing an alternative representation of the first data x. The first process uses a main neural network M (main NN) which has learned a relation between the first data x and the intermediate data q. The intermediate data q is a feature vector representing features of the first data x (particularly features contributing to relation between the first data x and the second data y). The main neural network M is an example of the first neural network.

The second processing portion 32 executes the second process in each of the plurality of unit steps on the time base. The second process is a process of generating the second data y based on the intermediate data q generated by the first processing portion 31. As shown in FIG. 3, the second processing portion 32 is configured to include N unit processing portions $U_1$ to $U_N$ corresponding to component values $y_n$ of the second data y in frequency bands different from one another. The intermediate data q generated by the first processing portion 31 is inputted in common to the N unit processing portions $U_1$ to $U_N$. Each unit processing portion $U_n$ executes a process of generating a component value $y_n$ of the second data y (hereinafter referred to as "unit process"). That is, the second process includes N unit processes of generating corresponding N component values $y_1$ to $y_N$ of the second data y.

Each unit processing portion $U_n$ ($U_1$ to $U_N$) is configured to include a sub-neural network $Q_n$ (sub-NN) and a sampling portion $D_n$. The sub-neural network $Q_n$ of the unit processing portion $U_n$ generates a probability distribution $p_n$ of a component value $y_n$. The kind of the probability distribution $p_n$ is optional. For example, a discrete probability distribution, a GMM (Gaussian Mixture Model) or a MoL (Mixture of Logistic distribution) is preferable as the probability distribution $p_n$. The plurality of sub-neural networks $Q_1$ to $Q_N$ (distinct networks) are an example of the second neural network. For example, the second neural network includes a plurality of distinct sub-neural networks $Q_1$ to $Q_N$.

The sampling portion $D_n$ of the unit processing portion $U_n$ samples a component value $y_n$ based on the probability distribution $p_n$ generated by the sub-neural network $Q_n$ in the previous stage. For example, the sampling portion $D_n$ generates a pseudorandom number following the probability distribution $p_n$ as the component value $y_n$. As is understood from the above explanation, the unit process by the unit processing portion $U_n$ is a process including the generation of the probability distribution $p_n$ by the sub-neural network $Q_n$ and the sampling of the component value $y_n$ by the sampling portion $D_n$. Incidentally, the sub-neural network $Q_n$ may output the component value $y_n$ directly. In the configuration where the sub-neural network $Q_n$ outputs the component value $y_n$, the sampling portion $D_n$ is omitted.

The intermediate data q is supplied to the sub-neural network $Q_1$ of the first unit processing portion $U_1$. The sub-neural network $Q_1$ is a neural network which has learned the relation between the intermediate data q and the probability distribution $p_1$. On the other hand, (n-1) component values $y_1$ to $y_{n-1}$ generated by the first to $(n-1)^{th}$ unit processing portions $U_1$ to $U_{n-1}$ are supplied to the sub-neural network $Q_n$ of each unit processing portion $U_n$ of the second to Nth unit processing portions together with the intermediate data q. For example, the component value $y_1$ generated by the first unit processing portion $U_1$ is supplied to the second sub-neural network $Q_2$ together with the intermediate data q. The component value $y_1$ generated by the first unit processing portion $U_1$ and the component value $y_2$ generated by the second unit processing portion $U_2$ are supplied to the third sub-neural network $Q_3$ together with the intermediate data q. In addition, (N-1) component values $y_1$ to $y_{N-1}$ generated by the first to $(N-1)^{th}$ unit processing portions $U_1$ to $U_{N-1}$ are supplied to the $N^{th}$ sub-neural network $Q_n$ together with the intermediate data q. As is understood from the above explanation, the sub-neural network $Q_n$ is a neural network which has learned the relation among the first to $(n-1)^{th}$ component values $y_1$ to $y_{n-1}$, the intermediate data q and the probability distribution $p_n$.

The probability distribution $p_1$ generated by the first sub-neural network $Q_1$ is a conditional probability distribution $p(y_1|q)$ with which the component value $y_1$ is to be generated on the condition that the intermediate data q has been observed. Incidentally, a probability distribution p(a|b) means a conditional probability distribution conditioned by b. On the other hand, the probability distribution $p_n$ generated by each of the second and following sub-neural networks $Q_n$ is a conditional probability distribution $p(y_n|q, y_1, \ldots y_{n-1})$ with which the component value $y_n$ is to be generated on the condition that the intermediate data q and the (n-1) component values $y_1$ to $y_{n-1}$ have been observed. As is understood from the above explanation, the component value $y_n$ generated by each of the second and following unit processing portions $U_n$ depends on not only the intermediate data q but also the (n-1) first to $(n-1)^{th}$ component values $y_1$ to $y_{n-1}$.

Incidentally, FIG. 3 has a configuration in which, for any number n satisfying 1≤n≤N, $y_n$ depends on all of $y_m$ satisfying 1≤m≤n-1. However, it will go well only if $y_n$ depends on at least one of $y_m$ satisfying 1≤m≤n-1. The dependency is determined desirably based on an intended property as to relationship among dimensions of the second data y. That is, the number of component values $y_m$ to be supplied to each sub-neural network $Q_n$ and the number m are optional. For example, one component value $y_{n-1}$ generated by the previous $(n-1)^{th}$ unit processing portion $U_{n-1}$ may be supplied to the $n^{th}$ neural network $Q_n$ together with the intermediate data q. In addition, the previous two component values $y_{n-1}$ and $y_{n-2}$ may be supplied to the $n^{th}$ neural network $Q_n$ together with the intermediate data q. Alternatively, each supply ($y_{n-1}$, i≥1) to each sub-neural network $Q_n$ obtained by a plurality of dependency destinations may be multiplied by a mask of 0 (a numerical value indicating independency) or 1 (a numerical value indicating dependency) so that the dependency or the independency can be implemented.

As is understood from the above explanation, when attention is paid conveniently to a first unit process of generating a component value $y_{n1}$ in a first frequency band of the N frequency bands and a second unit process of generating a component value $y_{n2}$ in a second frequency band other than the first frequency band, the component value $y_{n2}$ generated in the second unit process is supplied to a sub-neutral network $Q_{n1}$ to be used for the first unit process, together with the intermediate data q. The second frequency band is, for example, a frequency band lower than the first frequency band. That is, the second component value $y_{n2}$ corresponds to a frequency band lower than that of the first component value $y_{n1}$.

The main neural network M may have a desired structure. For example, it is a simple feedforward neural network where all of bonding layers have been laminated, or may be a CNN (Convolutional Neural Network). Alternatively, an RNN (Recurrent Neural Network) or a kind of neural network such as LSTM (Long Short-Time Memory) where a result of calculation is stored in an internal state to be used in the next calculation may be used. Incidentally, the CNN, the RNN and the kind of neural network such as LSTM are good in accuracy of inference and efficiency in calculation required for training and the inference.

Each sub-neural network $Q_n$ may also have a desired structure. When the N sub-neural networks $Q_1$ to $Q_N$ are used with dependencies as shown in FIG. 3, the simple feedforward neural network where all of bonding layers have been laminated, or the CNN may be used as each sub-neural network $Q_n$.

Incidentally, when the kind of neural network such as RNN or LSTM where a result of calculation is stored in an internal state to be used in the next calculation is used as the sub-neural network $Q_n$, it is sufficient to provide one sub-neutral network Q (single network). That is, the N sub-neural networks $Q_1$ to $Q_N$ corresponding to the number of component values $y_n$ are not necessary. For example, one sub-neutral network Q placed in the second processing portion 32 is also used in a unit process of generating any component value $y_n$, and used repeatedly by a total of N times for each unit step. In a specific configuration, one sub-neutral network Q outputs the component values $y_n$ of the second data y sequentially one by one in every unit process. A component value $y_n$ obtained in each unit process is supplied to the sub-neutral network Q in each of the next and following unit processes. Thus, the component values $y_n$ are generated. In each $n^{th}$ unit process, a component value $y_n$ depending on (n−1) component values $y_1$ to $y_{n-1}$ calculated in the first to $(n-1)^{th}$ unit processes is generated.

In either the configuration of FIG. 3 where N sub-neutral networks $Q_1$ to $Q_N$ are placed in parallel or the configuration where one sub-neutral network Q performs a unit process repeatedly by N times, the second process executed by the second processing portion 32 includes N unit processes of generating the N component values $y_1$ to $y_n$. As illustrated previously by way of example, pay attention to, of the N unit processes, the first unit process of generating the component value $y_{n1}$ and the second unit process of generating the component value $y_{n2}$. Then, it can be comprehensively expressed that, in the first unit process, the second component value $y_{n2}$ generated in the second unit process is supplied to the sub-neutral network Q together with the intermediate data q. For example, in each of the second and following $n^{th}$ unit processes, (n−1) component values generated by the first to $(n-1)^{th}$ unit processes are supplied to the sub-neutral network Q together with the intermediate data q.

2.3 Inference

In the inference, the main neural network M outputs the intermediate data q every unit step. For each component value $y_n$ of N component values $y_1$ to $y_N$ of the second data y, each sub-neural network $Q_n$ outputs the value itself, a probability distribution of the value, or a group of parameters expressing the probability distribution. Here, at least one of the N sub-neural network $Q_1$ to $Q_N$ outputs a component value $y_n$ for its unit step depending on a component value $y_n$ obtained by calculation with at least one other sub-neural network $Q_n$. When each sub-neural network $Q_n$ outputs a probability distribution $p_n$, a pseudorandom number following the distribution is generated to obtain an intended component value $y_n$.

Figure 4:
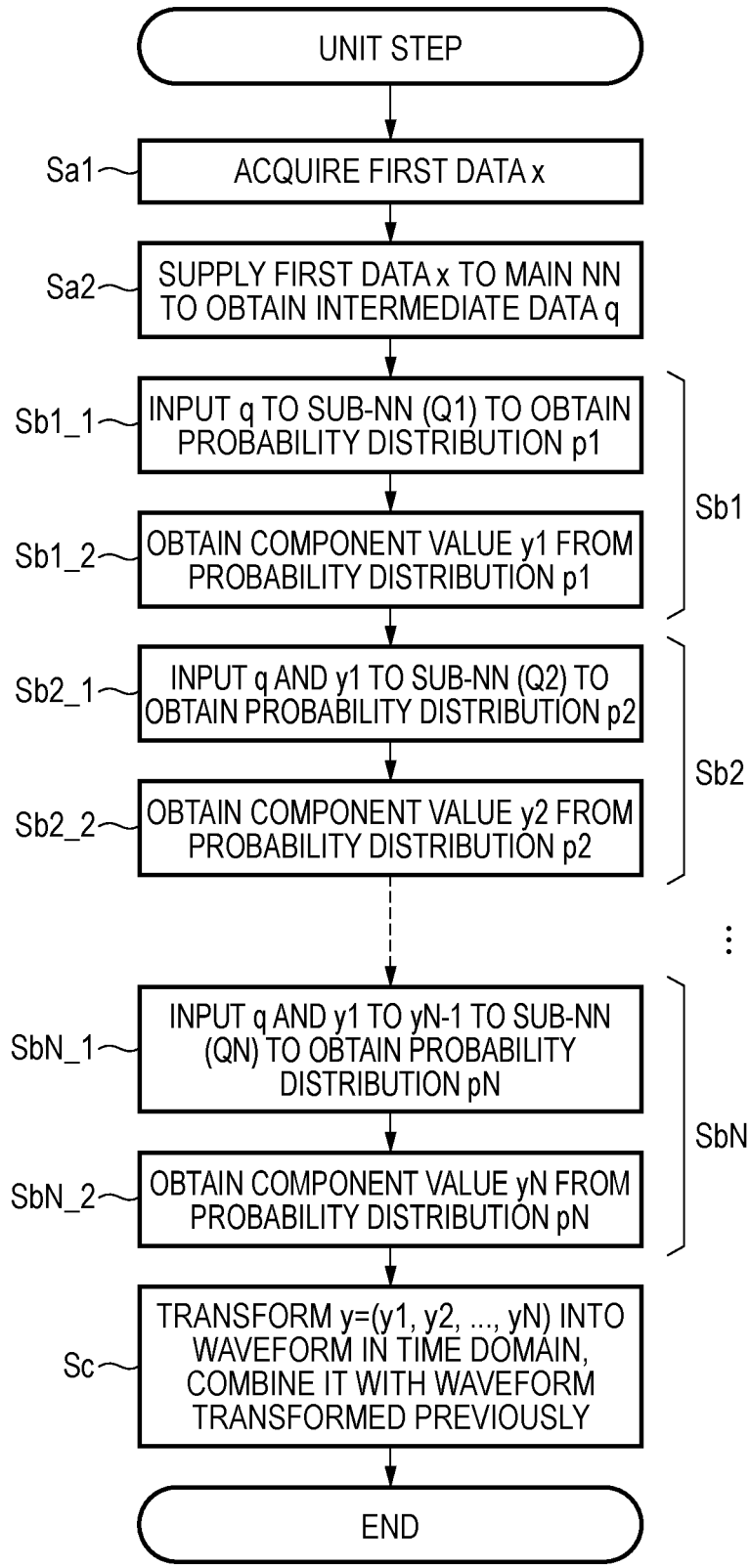
FIG. 4 is a flow chart showing a specific procedure of an operation of the information processing device by way of example.

FIG. 4 is a flow chart showing a specific procedure of the inference executed by the control unit 11, by way of example. The process of FIG. 4 is executed every unit step on the time base. Once the process of FIG. 4 is started, the information processing portion 22 acquires the first data x (Sa1). As described previously, the first data x includes the input data Din generated for the current unit step by the preprocessing portion 21, and the second data y generated for one or more previous unit steps. Incidentally, in the first unit step of the unit steps immediately after the inference of the unit steps is started, second data y of initial values is used. The information processing portion 22 supplies the first data x to the main neural network M to generate the intermediate data q.

The information processing portion 22 executes the first unit process (Sb1). Specifically, the information processing portion 22 supplies the intermediate data q to the sub-neural network $Q_1$ of the unit processing portion $U_1$ to generate a probability distribution $p_1$ (=p($y_1$|q)) (Sb1_1), and samples a component value $y_1$ from the probability distribution $p_1$ (Sb1_2).

The information processing portion 22 executes the second unit process (Sb2). Specifically, the information processing portion 22 supplies the intermediate data q and the component value $y_1$ to the sub-neural network $Q_2$ of the second unit processing portion $U_2$ to generate a probability distribution $p_2$ (=p($y_2$|q, $y_1$)) (Sb2_1), and samples a component value $y_2$ from the probability distribution $p_2$ (Sb2_2).

Such a unit process as described above is repeated until an $N^{th}$ component value $y_N$ is generated. In the $N^{th}$ unit process, the information processing portion 22 supplies the intermediate data q and the (N−1) component values $y_1$ to $y_{N-1}$ to the sub-neural network $Q_N$ of the unit processing portion $U_N$ to generate a probability distribution $p_N$ (=p($y_N$|q, $y_1$ to $y_{N-1}$)) (SbN_1), and samples the component value $y_N$ from the probability distribution $p_N$ (SbN_2).

When the unit process is repeated N times (that is, by the second process), the second data y constituted by the N component values $y_1$ to $y_N$ is generated. The waveform generating portion 23 converts the second data y into a waveform in the time region, and combines the converted waveform with waveforms converted in past unit steps to generate a continuous sound signal A (Sc). The sound signal A is supplied to the sound emitting unit 13. A sound corresponding to the sound signal A is emitted from the sound emitting unit 13.

2.4 Training

Figure 5:
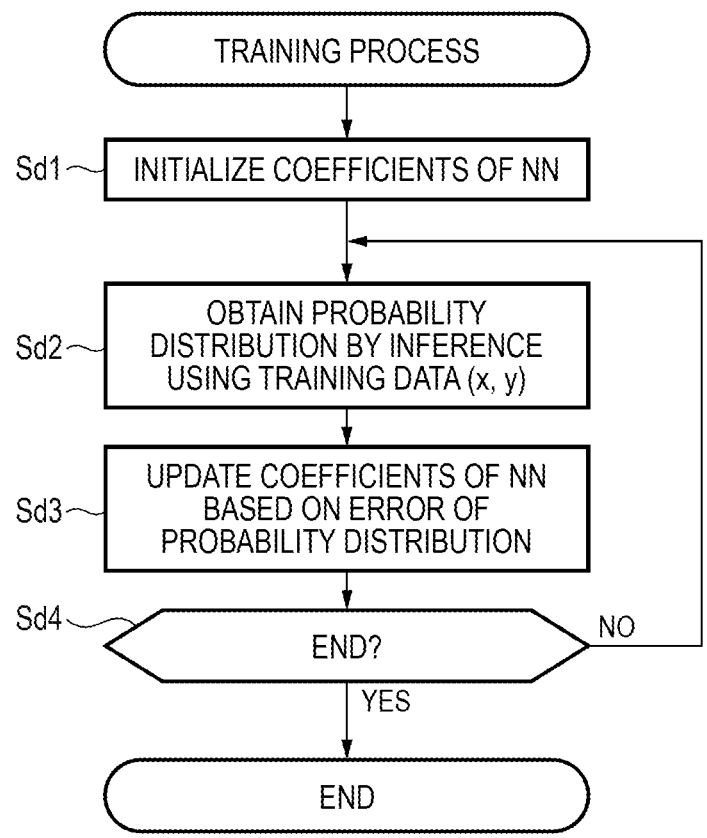
FIG. 5 is a flow chart showing a specific procedure of training by way of example.

FIG. 5 is a flow chart showing a procedure of training by way of example. The main neural network M and the N sub-neural networks $Q_1$ to $Q_N$ can be trained simultaneously. For training, first data x estimated as an input for inference is supplied to the main neural network M. When at least one of the N sub-neural networks $Q_1$ to $Q_N$ receives, as a part of an input thereto, a component value $y_n$ obtained by an output from another sub-neural networks $Q_n$ as in the configuration shown in FIG. 3, a ground truth value of the component value $y_n$ and the intermediate data q generated by the main neural network M are supplied to the sub-neural network. When the kind of neural network such as RNN or LSTM where a result of calculation is stored in an internal state to be used in the next calculation is used as a sub-neural network Q differently from the configuration shown in FIG. 3, ground truth values of the second data y prepared for each unit step are used as ground truth values of the second data y to be inferred by the sub-neural network Q. A group of neural networks can be trained by a backpropagation method applied with a large amount of training data prepared to pair the first data x with ground truth values of the second data y in this manner. That is, coefficients K for the whole of the neural networks are updated repeatedly by the backpropagation method. As described previously, the coefficients K updated by the training are stored in the storage unit 12. When each sub-neural network $Q_n$ outputs at least one component value $y_n$ of the second data y directly, a mean squared error between each output value and each ground truth value can be, for example, used as a target error to be minimized by the backpropagation method. When each sub-neural network $Q_n$ outputs a probability distribution $p_n$, each value obtained by reversing a sign of the logarithmic likelihood at each ground truth value in the probability distribution $p_n$ can be, for example, used as the target error.

2.5 Frequency Components and Conversion Thereof

The present embodiment uses the fact that general time series data in time domain (that is, time series of a plurality of pieces of data corresponding to time points different from each other on a time base) and second data y in frequency domain can be converted to each other. Such conversions can be mainly conducted by one of two methods. One method is a mathematical transformation from time series data to coefficients corresponding to frequency basis functions, and inverse mathematical transformation thereof. The other method uses a filter bank for each of conversion and inverse conversion.

2.5.1 Method Using Mathematical Transformation into Coefficients Corresponding to Frequency Bases Each of coefficients corresponding to frequency bases is suitable as each component value $y_n$ of the second data y. The frequency bases may be selected optionally, and there are many methods for transformation from general time series data to a vector consisting of coefficients corresponding to a plurality of frequency bases, or inverse transformation thereof. Examples of the methods include DFT (Discrete Fourier Transform), DCT (Discrete Cosine Transform), DST (Discrete Sine Transform), wavelet transform, and constant-Q transform. Complex sine functions are used as bases in the DFT, cosine functions are used as bases in the DCT, and sine functions are used as bases in the DST. Desired bases satisfying specific requirements are used in the wavelet transform or the constant-Q transform. Incidentally, on considering such transformation of time series data over discrete time steps, selection of one set of bases not always specify one transformation method. For example, the DCT includes various kinds of transformation methods in accordance with selected boundary conditions or other preconditions. Various kinds of coefficients obtained from time series data by those kinds of transformation differ from one kind to another though those kinds of coefficients use the same cosine functions as the bases. The bases are not limited to a set of orthogonal bases. For example, when the wavelet transform or the constant-Q transform is used, a set of non-orthogonal bases may be used. In any transformation, the bases relate to the frequency components of general time series data. The frequency mentioned here is not limited to a frequency in complex sine functions as bases for Fourier transform, but designates any number in general for controlling enlargement or reduction of the base in the time base direction.

Among various frequency bases and transforms that can be selected, it is most preferable to use sequence data of coefficient vectors obtained by MDCT (Modified Discrete Cosine Transform) as the second data y in the present embodiment, wherein the MDCT uses cosine functions as bases. Incidentally, the transformation is defined only for a sequence of real numbers. Therefore, the transformation cannot be adapted to sequence data of complex numbers. The adaptable range of the transformation is extremely wide because sequence data to be handled actually are often of real numbers.

The DCT is a collective term for transformation from a sequence of real numbers to coefficients corresponding to bases of cosine functions, and inverse transformation thereof. The DFT uses complex sine functions as bases and outputs coefficients of complex numbers for a sequence of real numbers. On the other hand, the DCT always outputs coefficients of real numbers. Each complex number consists of a pair of a real number and an imaginary number, and it is not easy to handle mutual dependencies among complex numbers on a neural network. However, coefficients of real numbers outputted by the DCT can be used easily as outputs of a neural network. In addition, it has been known that the DCT for actual time series data is generally good in energy concentration on a low frequency component in comparison with the DFT. Due to this characteristic, information of the original time series data can be prevented from being lost largely in coefficients of the DCT in spite of low accuracy in expression of coefficients corresponding to high frequency components if coefficients corresponding to low frequency components are expressed with sufficiently high accuracy. Incidentally, the DST is a collective term for transformation from a sequence of real numbers to coefficients corresponding to bases of sine functions, and inverse transformation thereof. The DST is not good as to energy concentration on a low frequency component in comparison with the DCT. However, the DST is a transform in which coefficients of real numbers are outputted for time series data of real numbers in the same manner as the DCT. Accordingly, the DCT and the DST are preferred among various frequency bases and transformations that can be selected.

The MDCT is a kind of discrete cosine transform, in which the number of coefficients corresponding to frequency bases can be reduced in comparison with the other kinds of DCT or DFT, on the assumption that mutual transformations per unit time are performed using frames where windows satisfying specific conditions have been overlapped each other at a specific ratio. According to a specific example, a window function of 2N points is used to perform the transformation while windows are double-overlapped by N points in each time step. On this occasion, a result of the transformation in each time step is a vector of N coefficients corresponding to frequency bases. Another DCT used on the same conditions obtains a vector of 2N coefficients corresponding to frequency bases. In comparison therewith, the MDCT obtains a vector of N coefficients corresponding to frequency bases to express the original sequence completely, the number of the coefficients is half of that in the DCT. In spite of using the double-overlapped window functions, the number of coefficients corresponding to the whole frequency bases during whole time range in the MDCT is same as the number of samples of the original time series data during the same time range. When the vector of coefficients corresponding to the frequency bases is used as an input or an output of a neural network, this characteristic of the MDCT contributes to reduction in the required size of the network. Accordingly, the MDCT is preferred among various kinds of DCT.

2.5.2 Method Using Rate Conversion Filter Bank

Each output value of a rate conversion filter bank for time series data is another kind of each component value $y_n$ (frequency component) of the second data y. The filter bank is an aggregate of filters with various passing frequency bands. Here, the filter bank that also performs thinning out or interpolation on the time series data is called a rate conversion filter bank. Further, the filter bank that performs thinning out is called an analysis filter bank, and the filter bank that performs interpolation is called a synthesizing filter bank. When the analysis filter bank is applied to general time series data, a filter output value of each frequency band is outputted at a lower sampling frequency than the original time series data (down sampling). Once a filter output value of each frequency band at each output time is arranged together as a vector, the vector can be used as the second data y (a frequency component vector) in the present embodiment. By applying the synthesizing filter bank to the sequence data outputted by the analysis filter bank, time series data which is same as or substantially same as the original time series data is outputted at the same sampling frequency as the original time series data.

Examples of rate conversion filter banks that can be used suitably in the present embodiment include a QMF (Quadrature Mirror Filter) bank, a PQMF (Pseudo Quadrature Mirror Filter) bank, and a conjugate quadrature filter bank. Those filters can perform calculation with thinning or interpolation efficiently by use of polyphase decomposition and equivalent exchange thereof.

3. Technical Effects

3.1 Reduction in Calculation Amount

Output sequence data in the present embodiment is a sequence of vectors in which each vector of the sequence is calculated for each frame. In the main neural network, calculation for a vector is performed every unit step of the frame. According to the embodiment in which the size of the main neural network M is increased while the size of each sub-neural network $Q_n$ is sufficiently reduced, the calculation amount can be reduced, for example, in comparison with direct inference of time series data such as audio samples in the WaveNet using a neural network having the same size as the main neural network M of the embodiment. More specifically speaking, a waveform sample is generated every sampling period in the WaveNet while the second data y in the present embodiment is generated every period N times longer than the sampling period.

Even in a case where the second data y obtained finally is converted into time series data, increase in calculation amount of the conversion is much smaller than the reduction in calculation amount by using the embodiment. Particularly when transformation to coefficients corresponding to frequency bases such as the MDCT is used, the conversion is realized by a combination of extremely small-scale calculation and IDFT (Inverse Discrete Fourier Transform). The calculation of the IDFT is performed efficiently using the algorism of FFT (Fast Fourier Transform. Thus, the increase in calculation amount caused by the conversion is extremely small.

3.2 Expansion of Receptive Field

In a neural network dealing with sequence data having a finite length, the time range of an input sequence that can be used for inference of an output value per unit time is called a receptive field. In order to establish inference correctly reflecting a time-dependent variance structure of intended time series data, the receptive field has to have the time range enough to express the structure.

A feedforward neural network or a folded neural network has a finite receptive field depending on the configuration thereof. In those neural networks, the receptive field can be elongated by simply increasing the number of input nodes or the size of each convolution kernel in the neural network. However, the increase in the number of input nodes or the size of the convolution kernel leads directly to increase in calculation amount for training and inference. The RNN or LSTM uses an intermediate result of calculation for inference in the past for the sake of inference. Theoretically all of input values in the past can be used. Practically, however, the influence of a past state is weakened gradually every unit step. Therefore, a substantially finite receptive field is provided, and it is not easy to control the time range of the substantially finite receptive field.

In the present embodiment, sequence data is inputted to the main neural network M every unit step (unit time) corresponding to every frame. Accordingly, when the frame interval is N samples, the substantial receptive field can be N times longer than that of the WaveNet in which each sample of time series data is supplied to a neural network in each sampling period.

3.3 Substantial Reduction in Quantization Error

A neural network may have a configuration in which a value expected as an output is quantized into values that can be taken, and one of the values is outputted though the expected value is originally continuous. Such a configuration may make an error of inference smaller. In the WaveNet, it has been proposed to handle a sound waveform subjected to mu-law quantization. On this occasion, an error due to the quantization is generated in addition to an error of inference in the neural network. Generally, when time series data is once converted into second data y in a frequency region and the second data y is then quantized and converted into time series data again, an error can be made smaller than when the time series data is directly quantized. For example, when a signal of sound, picture or the like is quantized in such a method, an error cannot be perceived easily in comparison with a signal quantized directly. Based on this tendency, in order to obtain time series data as the final output, the present embodiment adapts a neural network in which coefficients corresponding to frequency bases are quantized. As a result, the error due to the quantization cannot be perceived easily in comparison with that in time series data quantized directly as in the WaveNet.

3.4 Use of Property Per Frequency Band

Some time series data has different properties from one frequency band to another frequency band. For example, a major part of energy in human voice concentrates in a frequency band of about 4 kHz or lower, and the energy decreases suddenly in a frequency band higher than 4 kHz. In addition, the energy tends to fluctuate with time substantially periodically at 4 kHz or lower but fluctuate with time aperiodically in the frequency band higher than 4 kHz. Further, in the frequency band higher than 4 kHz, human hearing sensitivity decreases gradually.

A configuration or method for inference may be changed for each frequency band by use of the properties in the frequency band corresponding to each component value $y_n$ of the second data y. Examples of anticipated configurations include a configuration in which accuracy for quantizing the component value $y_n$ is changed for each frequency band, a configuration in which the size of each sub-neural network $Q_n$ is changed for each frequency band, and a configuration in which a method for expressing the probability distribution $p_n$ is changed for each frequency band. Due to such a configuration, the accuracy of inference for each frequency band becomes non-uniform so that inference with substantially high accuracy can be performed with respect to the size of the neural network. For example, pay attention to the first frequency band and the second frequency band as described above. When the second frequency band is lower than the first frequency band, the size of the sub-neural network $Q_{n2}$ corresponding to the component value $y_{n2}$ of the second frequency band is larger than the size of the sub-neural network $Q_{n1}$ corresponding to the component value $y_{n1}$ of the first frequency band. That is, the configuration in which a sub-neural network $Q_n$ corresponding to a component value $y_n$ of a lower frequency band has been increased is preferred.

In addition, by use of the second data y in the frequency region, it is also possible to perform a different operation for each frequency band on the probability distribution $p_n$ outputted for inference. For example, when the value of a parameter corresponding to a variance of the probability distribution $p_n$ is reduced in a low frequency band, the shape of the probability distribution $p_n$ can be made sharper so that randomness generated by sampling based on the probability distribution $p_n$ can be reduced. When this method is applied to estimate a human voice, it is possible to obtain a sound from which a noise component is reduced in comparison with that in a normal method. If a similar method is applied to a probability distribution for each audio sample in the WaveNet, a sound such as a fricative which should have a large noise characteristic originally cannot be estimated properly, for example, in a range of 4 kHz or higher. However, in the present embodiment, the degree of the noise characteristic can be controlled for each frequency band. Thus, such a problem does not arise easily.

3.5 Broad Applicability

Differently from the WaveNet solely adapted to generate time series of audio samples as scholar values or the NPSS adapted to infer a time series of vectors without reflecting any relation among dimensions of each vector, it is possible in the present embodiment to infer a series of vectors in consideration of both of the relation among dimensions of each vector and the temporal or special structure of the series of vectors. Accordingly, the embodiment can be applied directly to more general vector sequence data.

4. EXAMPLES

4.1 Example as Neural Vocoder

4.1.1 Summary

A neural network which receives low-dimensional features of a sound mainly relating to an amplitude spectrum as an input and outputs a waveform corresponding thereto is called a neural vocoder. Examples of the features of the sound supplied to the neural vocoder include a combination of low-order coefficients of mel-cepstrum and fundamental frequency information, mel-spectrogram, and so on. Those features are, for example, generated by any known transform technique from text information. Using the neural vocoder combined with such a transform technique, the information processing device 100 functions as a sound synthesizing system which can obtain a sound waveform from the text information. Incidentally, the amplitude spectrum as the received features does not have phase information. Therefore, the features in which the amplitude spectrum has been compressed to low-dimensional expression cannot be transformed into a waveform by a simple function such as inverse Fourier transform. Therefore, in the neural vocoder, a neural network which has learned real combinations of sound features and waveforms in advance is prepared in place of such a function, so that features relating to an amplitude spectrum can be transformed into a waveform by means of the neural network.

The present embodiment infers not a waveform but second data y. If the embodiment is tuned, such that the size of the main neural network M is increased enough while the size of each sub-neural network $Q_n$ is reduced, to infer the second data y of a sound with quality as high as that in the WaveNet can be inferred, the calculation amount in the embodiment will be as small as a friction of up to one several tenth of that in the WaveNet. In addition, a feature vector of a sound varies smoothly with time in comparison with a waveform of the same sound, generally. In either the WaveNet or the present embodiment, a sound with sufficient quality can be obtained from a feature vector in a time step of about 5 to 10 milliseconds. However, in the WaveNet, calculation of a neural network is performed every audio sample. Therefore, the feature vector has to be interpolated every time step of about 100 microseconds. In the present embodiment, the frequency of the interpolation process can be also reduced to be a friction of up to one several tenth.

It is preferable that a coefficient vector sequence obtained by applying the MDCT at a frame interval of about 2 to 64 samples to a sound waveform is used as the second data y which is an alternative representation of the sound waveform. Considering the fact that the sound waveform is rich in noise-like components, a probability-like property can be often more important than the values of the MDCT coefficients of the sound waveform itself. It is therefore preferable that the output of each sub-neural network $Q_n$ is a probability distribution of a MDCT coefficient of each dimension or parameters representing the probability distribution. On this occasion, discrete values of a probability distribution obtained by quantizing the MDCT coefficient of each dimension, or parameters representing a probability distribution for continuous values of the MDCT coefficient which aren't quantized can be used, as output each sub-neural network $Q_n$.

The N sub-neural networks $Q_1$ to $Q_N$ are preferably constituted so that inference of a coefficient of a high frequency component depends on a value obtained by calculation of inference of a coefficient of a low frequency component. Due to the fact that the size of each sub-neural network $Q_n$ is small and may cause some errors in inference and the fact that the inference passes through sampling from a probability distribution, the accuracy of inference decreases in a sub-neural network $Q_n$ as the number of direct or indirect dependencies on the other sub-neural networks of the sub-neural network $Q_n$ increases. In a lower frequency, energy of a voice signal is generally larger and more periodical, and hearing sensitivity is more delicate. In a higher frequency, energy of the voice signal is smaller and more aperiodical, and hearing sensitivity is duller. Accordingly, a voice with good quality can be obtained by correct inference in a low frequency band. It is therefore rational to perform correct inference in the low frequency band while inference conditioned to a result of the inference in the low frequency band is performed in a high frequency band.

A single RNN or LSTM may be set as the sub-neural network $Q_n$. However, it is more preferable that a plurality of sub-neural networks $Q_1$ to $Q_N$ are used as shown in FIG. 3, and each sub-neural network $Q_n$ is set as a simple feedforward type neural network or a folded neural network, so that dependencies can be designed more flexibly, and training by a backpropagation method can converge at a comparatively high speed.

The following description will be made based on the conditions described above as preferable in the embodiment.

4.1.2 Training

As for a sound to be used for training, ground truth values of second data y in a desired time range and input data Din (sequence data of a feature vector) corresponding thereto are input to the whole of the neural networks, and the whole of the neural networks are trained to output second data y so as to be close enough to the ground truth values which are the MDCT coefficient vector in the unit step next to the time range. In fact, each sub-neural network $Q_n$ outputs a probability distribution for a coefficient corresponding to each base of the MDCT. Accordingly, the backpropagation method is applied to minimize a value obtained by reversing a sign of a value of a logarithmic likelihood function representing probability distribution at the ground truth value, so as to update weighting coefficients K for the whole of the neural networks. This procedure is repeated over a large number of sounds to be used for training. Thus, the weighting coefficients K for the whole of the neural networks can be optimized gradually. As described previously, the coefficients K updated through the training are stored in the storage unit 12.

In the aforementioned procedure of training, each sub-neural network $Q_n$ is supplied with an output of main neural network M and ground truth values of the MDCT coefficients, corresponding to sub-neural network Q1 to Qn−1 on which the sub-neural network $Q_n$ depends, and corresponding to the output. Due to such training, the main neural network M is trained as a kind of encoder for compressing features of the inputted sequence data into a single vector, and each sub-neural network $Q_n$ is trained as a neural network for inferring a probability distribution of the MDCT coefficient value of its corresponding frequency band according to the output coefficient values of the lower frequency bands and the output vector from the main neural network M.

4.1.3 Inference

In the embodiment, preceding output vectors of the neural network are used autoregressively as current input values of the neural network at each time step, to obtain second data of an intended sound, corresponding to input data (the feature vector), over a desired time range (hereinafter referred as "synthesis range"). When inverse MDCT is applied to the second data y, the waveform of the intended sound can be obtained. More specifically, the following processes may be executed.

[Process 1] The control unit 11 supplies, to the main neural network M, initial values of the second data y of the sound, and input data Din at a head of sequence data of feature vectors of the intended sound, for a first time step within the synthesis range. The initial values of the second data can be one or more vectors corresponding to MDCT coefficients of all zero. Alternatively, when the MDCT coefficients corresponding to an initial signal of the intended sound are known in advance, one or more vectors corresponding thereto are used as the initial values. Process 1 corresponds to Steps Sa1 and Sa2 in FIG. 4.

[Process 2] The control unit 11 supplies intermediate data q outputted by the main neural network M to the sub-neural network $Q_1$ corresponding to the MDCT coefficient in the lowest frequency band (n=1) to obtain a probability distribution of the MDCT coefficient in the band. Process 2 corresponds to Step Sb1_1 in FIG. 4.

[Process 3] A pseudo-random number following the probability distribution obtained in the previous process is generated to obtain an MDCT coefficient $y_n$ in the band. Process 3 corresponds to Step Sbn_2 in FIG. 4.

[Process 4] The control unit 11 supplies the intermediate data q outputted by the main neural network M and one or more MDCT coefficients $y_n$ of the lower frequency bands inferred in the previous processes to another sub-neural network $Q_n$ to obtain a probability distribution of its corresponding MDCT coefficient. Process 4 corresponds to Step Sbn_1 in FIG. 4.

[Process 5] Process 4 and Process 3 are repeated for all the MDCT coefficients in in the current unit step to generate an MDCT coefficient vector y.

[Process 6] The control unit 11 outputs the MDCT coefficient vector obtained through the above processes as final output values in the unit step, and records the output values as values of the second data y in the current unit step.

[Process 7] The control unit 11 advances the current unit step to be processed by one step, and supplies first data x including one or more second data y outputted for one or more previous unit steps and input data Din expressing features of the intended sound to the main neural network M.

[Process 8] The control unit 11 repeats Processes 7 and 2 to 6 plenty of times to synthesize the whole sound within the synthesis range.

[Process 9] The control unit 11 applies inverse MDCT to time series of the second data y to obtain a sound waveform within the time range. A sound signal A expressing the sound waveform obtained in Process 9 is supplied to the sound emitting unit 13. Sound corresponding to the sound signal A is emitted from the sound emitting unit 13. Process 9 corresponds to Step Sc in FIG. 4.

4.2 Example as Sound Synthesizer

In place of the sequence of feature vector corresponding to the sound used in the aforementioned neural vocoder, sequence of discretized data such as phoneme symbols can be used as the input data Din. According to a further high-level example, sequence data of general written characters such as alphabets or Chinese characters can be used as the input data Din. Thus, the neural vocoder can be implemented as a more direct voice synthesizer that can generate a voice corresponding to the phoneme symbols or the written characters.

4.3 Example as Audio Effect

Optional transformation (such as a pitch changer or a multiband compressor) can be adapted to the MDCT coefficient vector sequence data corresponding to the input sound signal to obtain MDCT coefficient vector sequence data corresponding to an output sound signal. In place of the feature vector corresponding to the sound used in the aforementioned neural vocoder, information relating to the characteristic of the transformation is given to perform training and inference. This example can be carried out using, as an input, the MDCT coefficient vector sequence data corresponding to the input sound signal in place of the output vector regressing as an input.

5. Others

The functions of the information processing device 100 according to the aforementioned embodiment is implemented by cooperation between a computer (for example, the control unit 11) and a program. A program according to an embodiment of the present disclosure is provided in a form stored in a recording medium capable of being read by a computer, and installed in the computer. The recording medium is, for example, a non-transitory recording medium. A preferred example thereof is an optical recording medium (optical disk) such as CD-ROM. Another example thereof includes any recording medium having a known format, such as a semiconductor recording medium or a magnetic recording medium. Incidentally, the non-transitory recording medium includes any recording medium excluding transitory propagating signals, not excluding a volatile recording medium. Further, the program may be provided to the computer in a form of distribution through a communication network.

A subject executing artificial intelligence software for implementing a neural network is not limited to a CPU. For example, a processing circuit dedicated to a neural network, such as a tensor processing unit or a neural engine, or a DSP (Digital Signal Processor) dedicated to artificial intelligence may execute the artificial intelligence software. Further, a plurality of kinds of processing circuits selected from the aforementioned examples may execute the artificial intelligence software in a coordinated manner.

Additional Remark

From the embodiments described above, for example, the following configurations can be derived. Incidentally, in order to make it easy to understand each of the configurations, the reference letters used in the aforementioned embodiments are added in parentheses for the sake of convenience. However, it should be noted that the present disclosure is not limited to the aforementioned embodiments.

First Configuration

A method according to a first configuration of the present disclosure is a method for generating a frequency component vector of time series data, including: a first process of using a first neural network (main NN) supplied with first data (x) to generate intermediate data (q) representing an alternative representation of the first data (x); and a second process of generating a plurality of component values ($y_1$ to $y_N$) corresponding to a plurality of frequency bands based on the intermediate data; wherein: the first process and the second process are executed in each of a plurality of unit steps; the second process includes a plurality of unit processes corresponding to the plurality of frequency bands; each of the plurality of unit processes includes an inference by a second neural network (sub-NN) supplied with the intermediate data (q), to generate a corresponding one of the plurality of component values; and a first unit process corresponding to a first frequency band, among the plurality of unit processes, provides either a second component value ($y_{n2}$) generated by a second unit process corresponding to a second frequency band different from the first frequency band, or an intermediate value in the second unit process, and the intermediate data (q) to the second neural network (sub-NN) to generate a first component value ($y_{n1}$). The time series data is, for example, a waveform.

According to the aforementioned configuration, in the first unit process of generating the first component value corresponding to the first frequency band among the plurality of unit processes, the second component value generated for the second frequency band by the second unit process or the intermediate value generated in the second unit process, and the intermediate data are supplied to the second neural network. Accordingly, it is possible to generate the second data (y) including the plurality of component values ($y_1$ to $y_N$) corresponding to the plurality of frequency bands respectively so as to reflect the dependency between the first component value and the second component value.

In the aforementioned configuration, attention is conveniently paid to only any two unit processes (first unit process and second unit process) of the plurality of unit processes. It doesn't matter how inputs in the other unit processes are configured (such as the total number of input data, the range thereof, etc.). In addition, in the first unit process, it doesn't matter whether any component value other than the second component value (or the intermediate value) is input to the second neural network or not.

The second process is, for example, (1) a process of generating N component values using N sub-NNs corresponding to frequency bands different from one another, or (2) a process in which generation of each component value using a single RNN is repeated N times.

In case where the RNN is used as the sub-NN, not a component value but a value (an intermediate value) in the middle of the calculation of the sub-NN is used in the next inference.

Each unit process is, for example, (1) inference of a probability distribution by the second neural network and determination of a component value based on the probability distribution, or (2) direct inference of the component value by the second neural network. In the configuration (1), each of the plurality of unit processes includes a process of inferring the probability distribution of the component value by the second neural network (sub-NN) supplied with the intermediate data (q), and a process of determining a component value in accordance with the probability distribution.

Second Configuration

In an example (second configuration) of the first configuration, the first unit process supplies two or more component values generated by two or more unit processes including the second unit process, or two or more intermediate values (q) of the two or more unit processes, to the second neural network (sub-NN) to generate a first component value ($y_{n1}$).

Third Configuration

In an example (third configuration) of the first configuration, the plurality of unit processes are N unit processes, and in an $n^{th}$ unit process (n=2 to N), (n−1) component values generated in the first to (n−1)$^{th}$ unit processes, or (n−1) intermediate values generated in the unit processes are supplied to the second neural network (sub-NN) together with the intermediate data q.

In addition, the second unit process is executed before execution of the first unit process in each of the plurality of unit steps.

In addition, the two or more unit processes are executed before the first unit process in each of the plurality of unit steps.

Fourth Configuration

In an example (fourth configuration) according to any one of the first to third configurations, the plurality of component values of the frequency component vector are coefficients of discrete cosine transform (DCT) or discrete sine transform (DST).

Fifth Configuration

In an example (fifth configuration) according to any one of the first to third configurations, the plurality of component values of the frequency component vector are coefficients of modified discrete cosine transform (MDCT).

Sixth Configuration

In an example (sixth configuration) according to any one of the first to third configurations, the plurality of component values of the frequency component vector are output values from a filter bank of down sampling filters corresponding to the plurality of component values.

Seventh Configuration

In an example (seventh configuration) according to any one of the first to sixth configurations, the second frequency band is lower than the first frequency band.

Eighth Configuration

In an example (eighth configuration) according to the seventh configurations, the second neural network includes a plurality of distinct neural networks corresponding to the plurality of unit processes, and each of the plurality of unit processes includes an inference by a distinct neural network corresponding to each of the plurality of unit processes.

In addition, a distinct neural network corresponding to the second unit process is larger than a distinct neural network corresponding to the first unit process.

The second neural network is a single neural network shared among the plurality of unit processes, and each of the plurality of unit processes includes an inference performed by the single neural network.

Incidentally, the size of the neural network means, for example, the number of layers, the number of nodes or the number of channels in one layer. In addition, in case of a convolutional neural network, the size of a kernel of the convolution is also regarded as the size of the neural network.

Ninth Configuration

In an example (ninth configuration) according to any one of the first to eighth configurations, the second neural network is smaller than the first neural network.

Each configuration of the present disclosure can be embodied by an information processing device for executing the information processing method according to each of the aforementioned configuration or a program for causing a computer to execute the information processing method according to each of the aforementioned configuration.

The information processing method and the information processing device according to the present disclosure can achieve proper training and inference in a neural network while reducing the calculation amount.

What is claimed is:
1. A computer-implemented method for generating a frequency component vector of time series data in each unit step of a plurality of unit steps, by executing a first process and a second process in each unit step, wherein:
  the first process comprises the steps of:
    receiving first data; and
    processing the first data using a first neural network to generate intermediate data as an alternative representation of the first data; and
  the second process comprises the steps of:
    receiving the generated intermediate data; and
    generating, as the frequency component vector and using a second neural network including a plurality of distinct neural networks, a plurality of component values corresponding to a plurality of frequency bands based on the generated intermediate data such that:
    a first component value corresponding to a first frequency band is generated using a first distinct neural network among the plurality of distinct neural networks of the second neural network based on the generated intermediate data;

a second component value corresponding to a second frequency band different from the first frequency band is generated using a second distinct neural network among the plurality of distinct neural networks of the second neural network based on the generated intermediate data and the generated first component value corresponding to the first frequency band generated using the first distinct neural network among the plurality of distinct neural networks of the second neural network; and a third component value corresponding to a third frequency band different from the second frequency band is generated using a third distinct neural network among the plurality of distinct neural networks of the second neural network based on the generated intermediate data, the generated first component value corresponding to the first frequency band generated using the first distinct neural network among the plurality of distinct neural networks of the second neural network, and the generated second component value corresponding to the second frequency band generated using the second distinct neural network among the plurality of distinct neural networks of the second neural network.

2. The method according to claim 1, wherein:
the first component value corresponding to the first frequency band is generated using the first distinct neural network based on the generated intermediate data but not based on any other generated component value.

3. The method according to claim 1, wherein:
the plurality of component values of the frequency component vector are coefficients of a discrete cosine transform or a discrete sine transform.

4. The method according to claim 1, wherein:
the plurality of component values of the frequency component vector are coefficients of a modified discrete cosine transform.

5. The method according to claim 1, wherein:
the plurality of component values of the frequency component vector are output values from a filter bank of down sampling filters.

6. The method according to claim 1, wherein:
the second frequency band is lower than the first frequency band.

7. The method according to claim 1, wherein:
the second distinct neural network that generates the second component value is larger than the first distinct neural network that generates the first component value.

8. The method according to claim 1, wherein:
the second neural network is smaller than the first neural network.

9. The method according to claim 1, wherein:
the time series data is a waveform.

10. A device for generating a frequency component vector of time series data, comprising:
a first processing portion that receives first data and processes the first data using a first neural network to generate intermediate data as an alternative representation of the first data; and
a second processing portion that receives the generated intermediate data and generates, as the frequency component vector and using a second neural network including a plurality of distinct neural networks, a plurality of component values corresponding to a plurality of frequency bands based on the generated intermediate data such that:

a first component value corresponding to a first frequency band is generated using a first distinct neural network among the plurality of distinct neural networks of the second neural network based on the generated intermediate data;

a second component value corresponding to a second frequency band different from the first frequency band is generated using a second distinct neural network among the plurality of distinct neural networks of the second neural network based on the generated intermediate data and the generated first component value corresponding to the first frequency band generated using the first distinct neural network among the plurality of distinct neural networks of the second neural network; and a third component value corresponding to a third frequency band different from the second frequency band is generated using a third distinct neural network among the plurality of distinct neural networks of the second neural network based on the generated intermediate data, the generated first component value corresponding to the first frequency band generated using the first distinct neural network among the plurality of distinct neural networks of the second neural network, and the generated second component value corresponding to the second frequency band generated using the second distinct neural network among the plurality of distinct neural networks of the second neural network.

11. The device according to claim 10, wherein:
the time series data is a waveform.

12. A device for generating a frequency component vector of time series data in each unit step of a plurality of unit steps, by executing a first process and a second process in each unit step, the device comprising:
at least one computer; and
a data storage unit that stores a plurality of instructions to make the at least one computer execute an operation when the at least one computer executes the plurality of instructions, the operation comprising:
the first process comprising the steps of:
receiving first data; and
processing the first data using a first neural network to generate intermediate data as an alternative representation of the first data; and
the second process comprising the steps of:
receiving the generated intermediate data; and
generating, as the frequency component vector and using a second neural network including a plurality of distinct neural networks, a plurality of component values corresponding to a plurality of frequency bands based on the generated intermediate data such that:
a first component value corresponding to a first frequency band is generated using a first distinct neural network among the plurality of distinct neural networks of the second neural network based on the generated intermediate data;
a second component value corresponding to a second frequency band different from the first frequency band is generated using a second distinct neural network among the plurality of distinct neural networks of the second neural network based on the generated intermediate data and the generated first component value corresponding to the first frequency band generated using the first distinct neural network among the plurality of distinct neural networks of the second neural network; and a third component value corresponding to a third frequency band different from the second frequency band is generated using a third distinct neural network among the plurality of distinct neural networks of the second neural network based on the generated intermediate data, the generated first component value corresponding to the first frequency band generated using the first distinct neural network among the plurality of distinct neural networks of the second neural network, and the generated second component value corresponding to the second frequency band generated using the second distinct neural network among the plurality of distinct neural networks of the second neural network.

\* \* \* \* \*